(12) United States Patent
Jilani et al.

(10) Patent No.: US 10,658,694 B2
(45) Date of Patent: May 19, 2020

(54) POLAR PLATE FOR A FUEL CELL AND FUEL CELL STACK

(71) Applicants: VOLKSWAGEN AG, Wolfsburg (DE); AUDI AG, Ingolstadt (DE)

(72) Inventors: Adel Jilani, Burnaby (CA); Sanjiv Kumar, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 121 days.

(21) Appl. No.: 15/821,476

(22) Filed: Nov. 22, 2017

(65) Prior Publication Data

US 2018/0159164 A1 Jun. 7, 2018

(30) Foreign Application Priority Data

Nov. 23, 2016 (DE) .................... 10 2016 122 590

(51) Int. Cl.
*H01M 8/026* (2016.01)
*H01M 8/2465* (2016.01)
*H01M 8/0234* (2016.01)
*H01M 8/0267* (2016.01)
*H01M 8/0206* (2016.01)
*H01M 8/0258* (2016.01)
*H01M 8/0228* (2016.01)
(Continued)

(52) U.S. Cl.
CPC ......... *H01M 8/2465* (2013.01); *H01M 8/026* (2013.01); *H01M 8/0206* (2013.01); *H01M 8/0213* (2013.01); *H01M 8/0228* (2013.01); *H01M 8/0234* (2013.01); *H01M 8/0254* (2013.01); *H01M 8/0258* (2013.01); *H01M 8/0267* (2013.01); *H01M 8/1004* (2013.01); *H01M 2008/1095* (2013.01); *H01M 2250/20* (2013.01); *H01M 2300/0082* (2013.01); *Y02T 90/32* (2013.01)

(58) Field of Classification Search
None
See application file for complete search history.

(56) References Cited

U.S. PATENT DOCUMENTS

| 6,007,933 A | 12/1999 | Jones |
| 9,929,426 B2 * | 3/2018 | Fukuyama ............ H01M 8/241 |
| 2015/0364775 A1 * | 12/2015 | Jin ...................... H01M 8/0258 429/514 |

FOREIGN PATENT DOCUMENTS

| DE | 10 2014 224 025 A1 | 12/2015 |
| EP | 2 843 741 A1 | 3/2015 |

(Continued)

OTHER PUBLICATIONS

English machine translation of Roy et al., FR 2899386 (A1). dated Oct. 5, 2007 (Year: 2007).*

*Primary Examiner* — Tracy M Dove
(74) *Attorney, Agent, or Firm* — Seed Intellectual Property Law Group LLP

(57) ABSTRACT

The invention relates to a polar plate for a fuel cell, comprising at least one single plate with two opposing main sides, wherein the single plate has, on at least one of its main sides: elevations and free spaces arranged therebetween, which form a flow structure for an operating medium of the fuel cell; and spring projections which are arranged on the elevations and are designed to yield in case of a force effect taking place orthogonally to the main sides. Furthermore, the invention relates to a fuel cell stack with a polar plate according to the invention.

10 Claims, 6 Drawing Sheets

(51) Int. Cl.
*H01M 8/0213* (2016.01)
*H01M 8/0254* (2016.01)
*H01M 8/1004* (2016.01)
*H01M 8/1018* (2016.01)

(56) References Cited

FOREIGN PATENT DOCUMENTS

EP   2 826 093 B1   10/2015
FR   2 899 386 A1   10/2007

\* cited by examiner

POLAR PLATE FOR A FUEL CELL AND FUEL CELL STACK

BACKGROUND

Technical Field

The invention relates to a polar plate for a fuel cell. The polar plate comprises at least one single plate with two opposing main sides, wherein the single plate has elevations on at least one of its main sides and free spaces arranged therebetween, which form a flow structure for an operating medium of the fuel cell. The invention furthermore relates to a fuel cell stack having such a polar plate.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (usually proton-conducting) membrane and of a catalytic electrode (anode and cathode), respectively arranged on both sides of the membrane. The latter generally comprise supported precious metals, in particular platinum. In addition, gas diffusion layers (GDL) can be arranged on both sides of the membrane electrode assembly, on the sides of the electrodes facing away from the membrane. Usually, the fuel cell is formed by a plurality of MEAs arranged in a stack (fuel cell stack) whose electrical power outputs accumulate. Bipolar plates (also called flow field plates or separator plates or polar plates), which ensure a supply of the single cells with the operating media, i.e., the reactants, and which are usually also used for cooling, are usually arranged between the individual membrane electrode assemblies. In addition, the bipolar plates also ensure an electrically conductive contact to the membrane electrode assemblies.

During operation of the fuel cell, the fuel (anode operating medium), particularly hydrogen $H_2$ or a gas mixture containing hydrogen, is supplied to the anode via an open flow field of the bipolar plate on the anode side, where electrochemical oxidation of $H_2$ to protons $H^+$ with loss of electrons takes place ($H_2 \rightarrow 2\ H^+ + 2\ e^-$). A (water-bound or water-free) transport of the protons from the anode chamber into the cathode chamber is effected via the electrolyte or the membrane, which separates the reaction spaces from each other in a gas-tight manner and electrically insulates them. The electrons provided at the anode are guided to the cathode via an electrical line. The cathode receives oxygen or a gas mixture containing oxygen (such as air) via an open flow field of the bipolar plate on the cathode side, so that a reduction of $O_2$ to $O^{2-}$ with gain of electrons takes place ($\frac{1}{2}\ O_2 + 2\ e^- \rightarrow O^{2-}$). At the same time, the oxygen anions react in the cathode chamber with the protons transported across the membrane to form water ($O^{2-} + 2\ H^+ \rightarrow H_2O$).

So-called monopolar plates, which only have a flow field on a side facing the fuel cell stack, are arranged instead of bipolar plates at stack ends of the fuel cell stack. Overall, bipolar plates and monopolar plates can be summarized under the term "polar plates."

The fuel cell stack is supplied with its operating media, that is the anode operating gas (hydrogen for example), the cathode operating gas (air for example), and the coolant by means of the main supply channels, which run through the stack in its entire stack direction and from which the operating media are supplied to the single cells via the bipolar plates. There are at least two such main supply channels available for each operating medium, namely one for supplying and one for discharging the respective operating medium.

Typically, a membrane electrode assembly includes a film frame which frames the membrane with the electrodes. This allows the membrane and the electrodes to be confined to the active area to save material costs of the relatively expensive membrane and electrodes. However, the mostly thermoplastic films of the film frame are prone to creep and therefore narrow channels of so-called distribution areas of the bipolar plates. Although thermosetting films (frame) can be used, these are more complex to process.

It is also known that the membrane of the membrane electrode assembly extends to the edge of the bipolar plate and seals on the adjacent bipolar plates seal toward the membrane or the seals are arranged directly on the membrane and seal toward the bipolar plates. Again, there is the problem mentioned that over time the membranes creep into the channels of the distribution areas.

In the active area, the gas diffusion layers disposed between the membrane electrode assemblies and the bipolar plates prevent the membrane electrode assemblies from narrowing channels of the flow field in the active area. However, since the fuel cell stack is compressed in the stack direction, the gas diffusion layers are pushed into the channels of the flow field, which can also lead to a narrowing of the channels.

U.S. Pat. No. 6,007,933 A discloses support structures in the form of gratings, which are arranged between the gas diffusion layers and bipolar plates of a fuel cell stack. The support structures form a field of regularly arranged openings for the passage of reactants. Webs arranged between the openings cause the gas diffusion layers to penetrate only into the openings of the support structures but not (or only slightly) into the channels of the bipolar plates. However, it has been proven to be disadvantageous that ohmic losses occur due to the support structure.

Furthermore, it is known that the fuel cell stack is pressed with so-called compression springs, which act on stack ends of the fuel cell stack. However, these compression springs are heavy and bulky and also cannot compensate for local tolerances within the fuel cell stack.

EP 2 843 741 A1 discloses a fuel cell stack with membrane electrode assemblies, between which two separators are respectively arranged. Between the two separators, a coolant cavity is formed, in which a distance jumper is arranged. The distance jumper has a spring function. For this purpose, the distance jumper has a base plate which contacts one of the separators. From the base plate project a plurality of spring arms which are connected at one end to the base plate and press at an opposite, free end against the second separator.

BRIEF SUMMARY

The invention is based on the task of proposing a polar plate which has a further improved tolerance compensation compared to the prior art.

This task is achieved by a polar plate for a fuel cell, having the features of the independent claim.

The polar plate for a fuel cell comprises at least one single plate with two opposing main sides, wherein the single plate has elevations on at least one of its main sides
    and free spaces arranged therebetween, which form a flow structure for an operating medium of the fuel cell, and
        has spring projections which are arranged on the elevations and are designed to yield in case of a force effect taking place orthogonally to the main side.

Thus, the spring projections are not realized by a layer separate from the single plate but are part of the single plate. As a result, a particularly compact design and a direct force effect on the single plate are achieved. If a separate layer were provided for the spring projections, as is known from the prior art, the base plate of this layer would have to absorb bending moments which arise due to the deformation of the spring projections. For deformations of the single plate and thus for a loss of power not to occur, the base plate would have to be formed relatively stable. Due to the fact that, according to the invention, the spring projections are arranged not only on the elevations, but are encompassed by the single plate, the forces are absorbed during a deformation of the spring projections by the single plate, which is already formed relatively stable. Thus, a more direct force transmission occurs within the fuel cell stack and a structural rigidity thereof is increased. The fact that the spring projections are arranged on the elevations is to be understood such that the spring projections are not arranged on a bottom of the free spaces, for example not on a base of channels.

Preferably, the spring projections are formed from a metal sheet by punching. Thus, a variety of spring projections can be manufactured relatively easily and inexpensively.

In particular, the polar plate comprises at least two or at least three single plates. Preferably, the polar plate comprises two single plates. In this case, the main sides of the single plates, which form the outer sides of the polar plate, typically form flow structures for each of the reactants. At least one main side of the single plates disposed within the polar plate may form a flow structure for a coolant. Furthermore, if the polar plate preferably comprises three single plates, the middle plate of the single plates in particular forms a flow structure for the coolant. The main sides of the outer single plates arranged inside the polar plate can also form flow structures for the coolant, or be flat. In order to increase structural strength, it may be provided that the middle single plate is formed of a different material than the two outer single plates. Preferably, the middle single plate is a metal plate, while the outer single plates are in particular single plates made of carbon.

Because of the spring projections, separate compression springs, which are typically arranged in end portions of the fuel cell stack or the fuel cell, are in particular no longer needed. For this purpose, the spring projections can be formed of each single plate which forms an anode plate and/or a cathode plate. Further, the spring projections can be formed of each single plate which forms a coolant plate. The spring forces of the spring projections can also act locally within the fuel cell stack, allowing a more even compression, while separate compression springs can only act on the interior of the fuel cell stack from outside the fuel cell stack.

The main sides of the single plates denote the largest sides in terms of area of the single plates, in contrast to the narrow sides of the single plates, which surround the main sides.

Preferably, the spring projections protrude obliquely from the single plate. Thus, the spring projections within a compressed fuel cell are deformed so far from an adjacent layer until the adjacent layer rests on the elevations.

A deformation of the spring projections thus takes place until the adjacent layer forms "a block" with the single plate.

It is preferably provided that the spring projections project from the elevations. Thus, the spring projections each have an end which is connected to the elevations. Furthermore, the spring projections have an end which is opposite this end and which is free, that is not connected to the single plate. As a result, a particularly easy-to-use flexible spring is realized.

It is preferably provided that the spring projections protrude from an edge region of the elevations and at least partially cover the nearest free spaces. As a result, the spring projections thus cover the closest free spaces at least partially. This is particularly advantageous because a layer adjacent to the flow structure of the single plate within the fuel cell is thus prevented from entering the free spaces of the flow structure by the spring projections. This is done with the least possible use of materials, since the spring projections extend in the direction of the nearest free spaces, and thus as little as possible of the spring projection design length is spent to bridge an elevation to an adjacent free space.

It is preferably provided that the free spaces are formed as channels and the spring projections extend along the channels. Thus, the spring projections have an elongated course along the channels, whereby an adjacent layer (in particular an adjacent plate) is supported particularly effectively. This is particularly advantageous if the main side, which has the spring projections, is disposed within the polar plate, since no leakage of a reactant from the channels can be inhibited there.

According to a preferred embodiment of the invention, it is provided that the main side, on which the spring projections are arranged, is disposed within the polar plate. Thus, the spring projections are disposed within a coolant cavity of the polar plate, whereby the polar plate is pressed apart from the inside.

It is preferably provided that the single plate has the spring projections on its two main sides. Thus, free spaces can be bridged on both sides of the single plate. This is also particularly advantageous if the single plate is a middle single plate of the polar plate, since free spaces are then bridged to the single plates adjacent to both main sides of the middle single plate and an electrical contact is maintained.

According to a preferred embodiment of the invention, it is provided that the main side, on which the spring projections are arranged, is a reactant side of the polar plate. Thus, the spring projections support an adjacent gas diffusion layer and/or membrane electrode assembly, which prevents delamination, in particular of the membrane electrode assembly. There is thus an increased compression of the gas diffusion layer and/or membrane electrode assembly between the elevations of the flow structure. At the same time, the spring projections prevent the gas diffusion layer and/or membrane electrode assembly from penetrating into the free spaces of the flow structure and narrowing them. Thus, wider free spaces, in particular channels, of the flow structure are also possible.

Furthermore preferably, it is provided that the spring projections are arranged on both opposing main sides of the polar plate. This is particularly advantageous if the polar plate is a bipolar plate and thus adjacent components on both sides of the polar plate are supported.

It is preferably provided that the spring projections are integrally connected to the single plate. This represents a simple variant of how the spring projections, in particular with a spring carrier connecting the spring projections, can be manufactured and subsequently can be materially connected to the single plate. The spring projections do not need to be firmly bonded directly to the single plate, but in particular the spring carrier could also be firmly bonded to the single plate (i.e., connected by atomic or molecular forces), for example by welding or gluing. In this case, the spring projections do not need to be firmly bonded directly to the single plate. Thus, a component which is integrally connected to the spring projections could also be firmly bonded to the single plate. The single plates of the polar plate can also be firmly bonded to each other.

It is preferably provided that the spring projections are an integral component of the single plate. Thus, the spring projections are formed from the material of the single plate. For example, the spring projections were formed from the same metal sheet of the single plate or in the same shape as the single plate.

Preferably, the single plate has spring carriers, to each of which a plurality of the spring projections are integrally connected, wherein preferably the spring carriers are adapted to a shape of the elevations. Due to the spring carriers, the relatively small spring projections are easier to handle during production. The fact that the spring carriers are adapted to the shape of the elevations, i.e., for example, the spring carriers follow an elongated course of the elevations, the spring carriers can be easily supported on the elevations and be connected to them.

It is preferably provided that the single plate has a spring plate with a plurality of integrally connected spring carriers. As a result, the production of the single plate having spring projections is further simplified.

In particular, it is provided that the polar plate is a bipolar plate. As a result, the polar plate has flow structures arranged on both sides. Furthermore, the polar plate may also be a monopolar plate with a flow structure arranged on one side only, as may be provided, for example, at the ends of a fuel cell stack. Polar plates generally serve to supply the operating media to the anode and/or cathode chambers and, in the case of bipolar plates, furthermore establish the electrical connection between the individual fuel cells. In addition, they have a coolant cavity, which serves the passage of a coolant and thus the temperature control of the fuel cell stack.

According to a preferred embodiment of the invention, it is provided that the single plate forms flow structures for a coolant on both main sides and has a cross-section of a profiled metal sheet (in particular a corrugated cross-section) in the area of the flow structures, wherein flanks of the profiled metal sheet have continuous recesses, in particular slots. Thus, the free spaces of the flow structure of one main side are arranged within the elevations of the flow structure of the other main side. Through the recesses, the free spaces of both main sides are connected. As a result, a flow of a coolant is made more efficient, in particular a pressure loss of the coolant is thus reduced.

Preferably, the spring projections have a material thickness which corresponds to 30 to 70 percent, in particular 40 to 50 percent, furthermore preferably 45 to 55 percent, of a material thickness of the polar plate (for example a metal sheet of the polar plate). As a result, a sufficient contact pressure within the fuel cell stack is achieved.

Furthermore, a fuel cell stack having at least one polar plate according to the invention is provided. Typically, the fuel cell stack has a plurality of polar plates, wherein a membrane electrode assembly is respectively arranged between two polar plates. According to a particularly preferred embodiment, compression springs, which would otherwise be arranged in at least one stack end of the fuel cell stack, can be dispensed with as a result of the at least one polar plate, which comprises the spring projections. Preferably, the fuel cell stack thus has no compression springs (in particular in the stack ends) apart from the spring projections. Thus, the plurality of (very light) spring projections embedded in the fuel cell stack replaces the (very heavy) compression springs. As a result, a weight reduction of the fuel cell stack as well as a more uniform pressing within the fuel cell stack is achieved. Furthermore, a deflection of the end plates of the fuel cell stack is minimized.

Furthermore provided is a vehicle which comprises a fuel cell stack according to the invention. The vehicle is preferably an electric vehicle in which an electrical energy generated by the fuel cell system serves to supply an electric traction motor and/or a traction battery.

Additional preferred embodiments of the invention arise from the other features stated in the dependent claims.

The various embodiments of the invention mentioned in this application may be combined advantageously with one another unless stated otherwise in individual cases.

BRIEF DESCRIPTION OF THE SEVERAL VIEWS OF THE DRAWINGS

The invention is explained below in exemplary embodiments with reference to the respective drawings. The following is shown.

DETAILED DESCRIPTION

Figure 1:
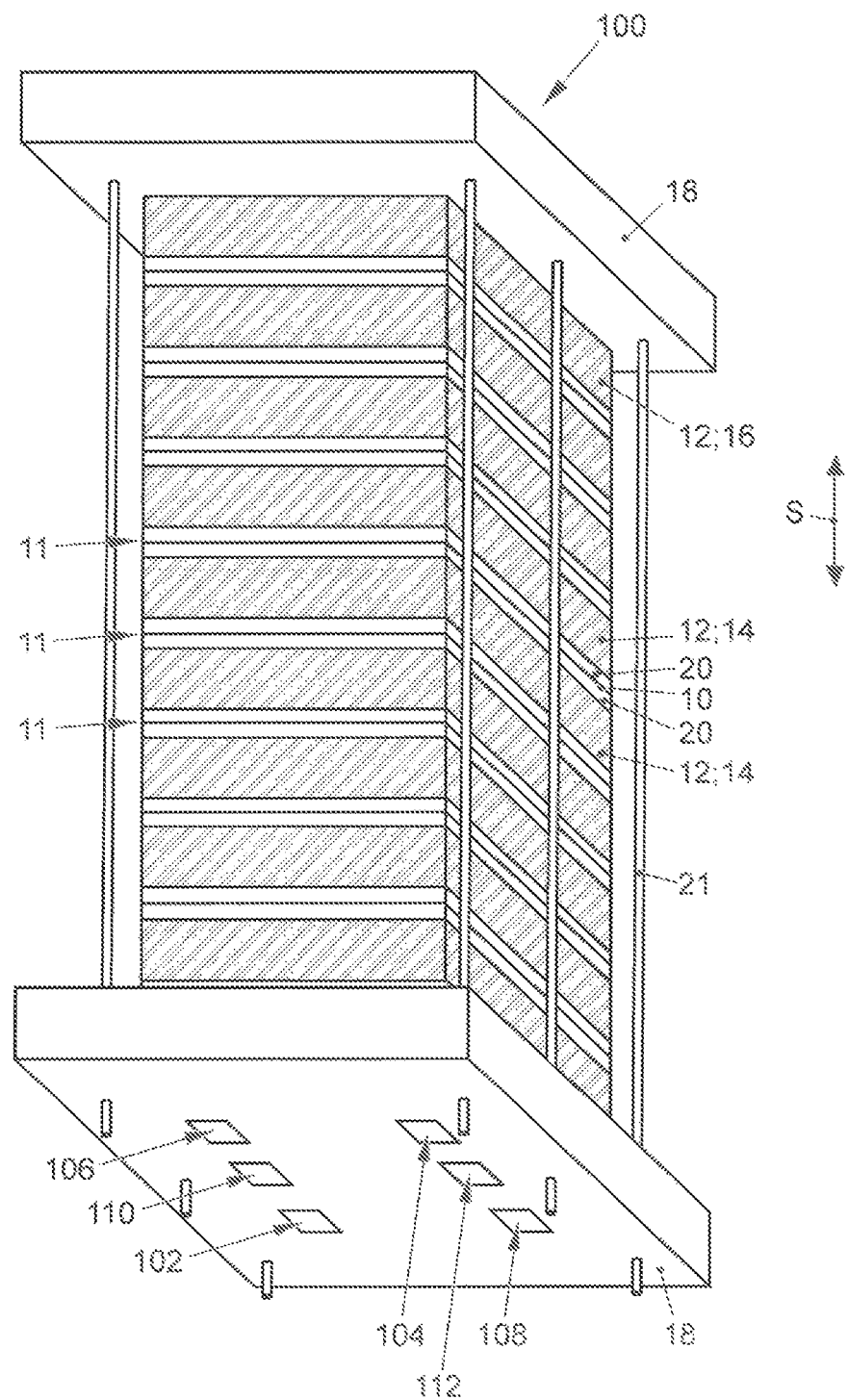
FIG. 1 shows a schematic representation of a fuel cell stack according to a preferred embodiment.

FIG. 1 shows a schematic representation of a fuel cell stack denoted as a whole by 100 according to a preferred embodiment of the invention. The fuel cell stack 100 is part of a vehicle (not shown in detail), in particular an electric vehicle, which has an electric traction motor, which is supplied with electrical energy by the fuel cell stack 100.

The fuel cell stack 100 includes a plurality of alternately arranged (stacked) membrane electrode assemblies 10 and polar plates 12 on their main sides. Overall, a plurality of stacked single cells 11 thus form the fuel cell stack 100, wherein the fuel cell stack 100 is often also referred to as a fuel cell.

The polar plates 12 are formed as bipolar plates 14, provided they are arranged between membrane electrode assemblies 10. The two polar plates 12, which are arranged between membrane electrode assemblies 10 and end plates 18 of the fuel cell stack 100, are called monopolar plates 16. Between the polar plates 12 and the respective membrane electrode assemblies 10, anode and cathode chambers (not shown) are arranged, which are bounded by circumferential seals 20. In order to produce the sealing function of the seals 20 and to press the individual components of the fuel cell stack onto one another, the fuel cell stack 100 is pressed in the stack direction S by means of tension elements 21, for example tie rods.

Figure 2:
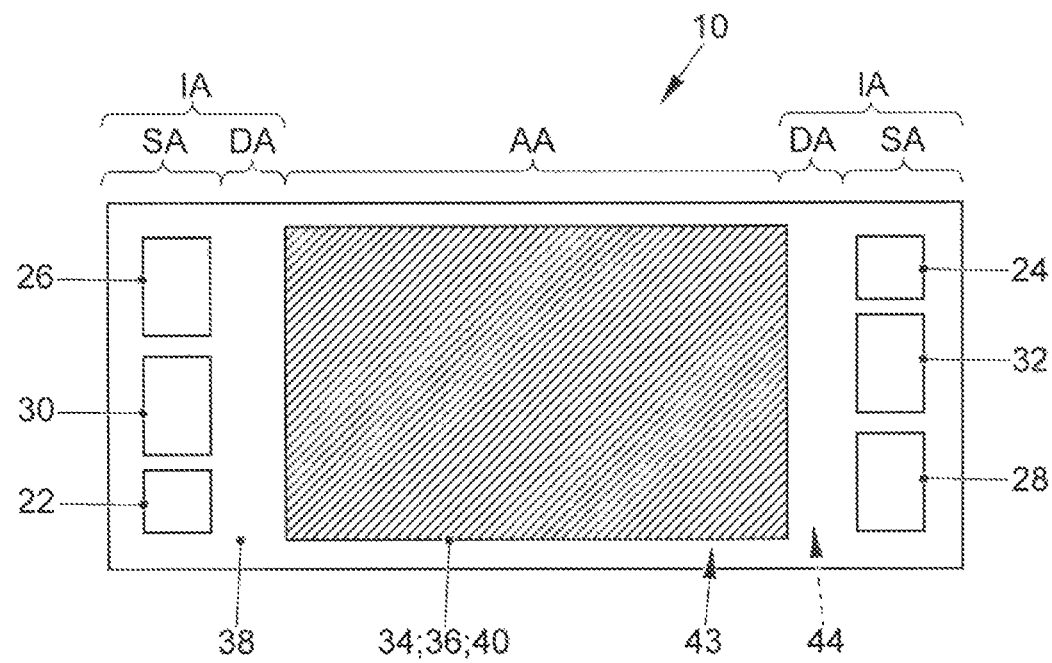
FIG. 2 shows a schematic plan view of a membrane electrode assembly.
Figure 3:
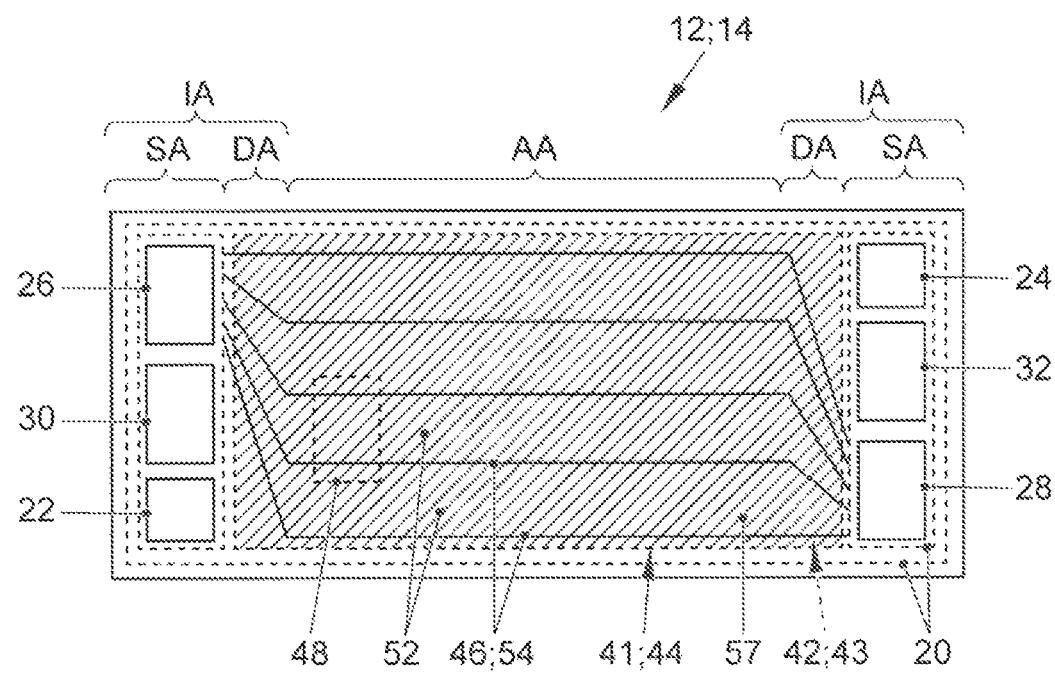
FIG. 3 shows a schematic plan view of a polar plate.

The fuel cell stack 100 is penetrated in the stack direction S by a plurality of main supply channels 102-112 formed within the fuel cell stack 10 by supply openings 22-32 of the membrane electrode assemblies 10 and polar plates 12 (see FIGS. 2 and 3).

FIG. 2 schematically shows a membrane electrode assembly 10 (MEA) with a membrane 34 and electrodes 36 planarly arranged on both sides of the membrane 34. The areal extent of the membrane 34 and of the electrodes 36 may also typically correspond to the areal extent of gas diffusion layers 40 which are arranged inside the fuel cell stack 100 on both sides of the membrane electrode assembly 10. Furthermore, the membrane-electrode arrangement 10 can have a film frame 38, which typically surrounds the membrane electrode assembly 10 in a manner overlapping on both sides.

FIG. 3 schematically shows a polar plate 12 and typically comprises at least a first single plate 41 and a second single plate 42, wherein only the first single plate 41 can be seen in FIG. 3, the second single plate 42 being covered by the first single plate 41. Furthermore, the polar plate 12 may also comprise a third single plate 49 (see FIGS. 4 to 10).

Both the membrane electrode assembly 10 and the polar plate 12 are subdivided into an active area AA and inactive areas IA. The active area AA is characterized by the fact that the fuel cell reactions take place in this area. For this purpose, the membrane electrode assembly 10 has the catalytic electrodes 36 in the active area AA on both sides of the membrane 34 (an ion-conducting polymer electrolyte membrane). Also typically present within the fuel cell 100, gas diffusion layers (not shown in FIGS. 1 to 3) disposed on both sides of the membrane electrode assembly 10 typically have substantially the same extent as the active area AA. The (electrochemical) inactive areas IA can be subdivided into supply areas SA and distribution areas DA. Within the supply areas SA, the supply openings 22 to 32 are arranged, which in the stacked state are substantially aligned with one another and form the main supply channels 102 to 112 within the fuel cell stack 100 (see FIG. 1).

The MEA 12 has an anode side 43, which is visible in FIG. 2. Thus, the illustrated catalytic electrode 36 is formed on the anode side 43 as an anode, for example as a coating on the polymer electrolyte membrane. The cathode side 44 not visible in FIG. 2 has a corresponding catalytic electrode 36, here the cathode.

The polar plate 12 shown in FIG. 3, which is formed as a bipolar plate 14, likewise has a cathode side 44, which is visible in the illustration, but which adjoins the cathode side 44 of the membrane electrode assembly 10 within the fuel cell stack 100. Furthermore, the polar plate 12 has an anode side 43 (not visible in FIG. 3) which adjoins the anode side 43 of the membrane electrode assembly 10 within the fuel cell stack 100. On the visible main side of the polar plate 12, open, in particular groove-like, channel structures are shown, which connect the cathode inlet opening 26 with the cathode outlet opening 28. Shown are only five exemplary channels 46, a much larger number generally being present. Instead of discrete channels 46, other structures may also be realized. Likewise, the anode side 43 of the bipolar plate 14, which is not visible here, has corresponding channels which connect the anode inlet opening 22 to the anode outlet opening 24. These channels for the anode operating medium are also designed as open, in particular groove-like, channel structures.

Between the two single plates 41, 42, enclosed coolant channels extend inside the polar plate 12, which coolant channels connect the coolant inlet opening 30 with the coolant outlet opening 32.

Furthermore, FIG. 3 shows dashed lines, which indicate a course of seals 20, for example elastomer seals. Alternatively, the seals 20 could be attached to the membrane electrode assemblies instead of the polar plates 12.

During operation of the fuel cell stack 100, the coolant enters through an inlet-side coolant main supply channel 110 and arrives via a coolant inlet opening 30 in a coolant cavity 66 (see FIGS. 4 to 14) within the polar plate 12. After the coolant flows through the coolant flow field, it exits the fuel cell stack 100 through a coolant outlet opening 32 and an outlet-side coolant main supply channel 112. In order to prevent unwanted leakage of the coolant, the single plates 41 and 42 are sealed toward each other.

An anode gas (i.e., fuel, for example hydrogen) enters the fuel cell stack 100 through an inlet-side anode main supply channel 102 and arrives via an anode inlet opening 22 in the distribution area DA on the anode side 43 of the bipolar plate 14. Subsequently, the anode gas flows into the active area AA, passes through the adjacent gas diffusion layer (not shown), and participates in the fuel cell reaction at the electrode 36. Residual anode gas flows through the distribution area DA to an anode outlet opening 24 and exits the fuel cell stack 100 through an associated outlet-side anode main supply channel 104. On the anode side 43 of the membrane electrode assembly 10, an anode chamber is sealed toward the surroundings of the fuel cell stack 100 and toward the openings 22 to 32 by seals 20, which are pressed onto the adjacent film frame 38 within the fuel cell stack 100.

On the cathode side 44 of the membrane electrode assembly 10, a cathode gas (in particular oxygen or an oxygen-containing mixture, preferably air) enters the fuel cell stack 100 through an inlet-side cathode main supply channel 106 and arrives in the distribution area DA on the cathode side 44 of the bipolar plate 30 via a cathode inlet opening 26. Subsequently, the anode gas flows into the active area AA, passes through the adjacent gas diffusion layer and participates in the fuel cell reaction at the electrode (both not shown). Reaction products and residual cathode gas flow through the distribution area DA to a cathode outlet opening 28 and exit the fuel cell stack 100 through an associated outlet-side cathode main supply channel 108. Also on the cathode side 44 of the membrane electrode assembly 10, a cathode chamber is sealed toward the surroundings of the fuel cell stack 100 and toward the openings 22 to 32 by seals 20, which are pressed onto the adjacent film frame 38 within the fuel cell stack 100.

Anode and cathode chambers are sealed toward one another by the film frame 38 and the membrane electrode assembly 10.

Figure 4:
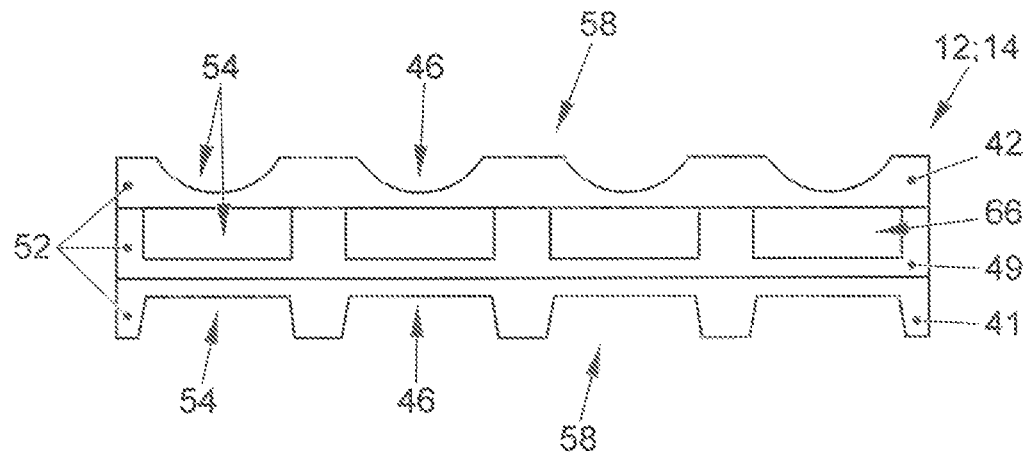
FIG. 4 shows a side view of a partial area of a polar plate.
Figure 5:
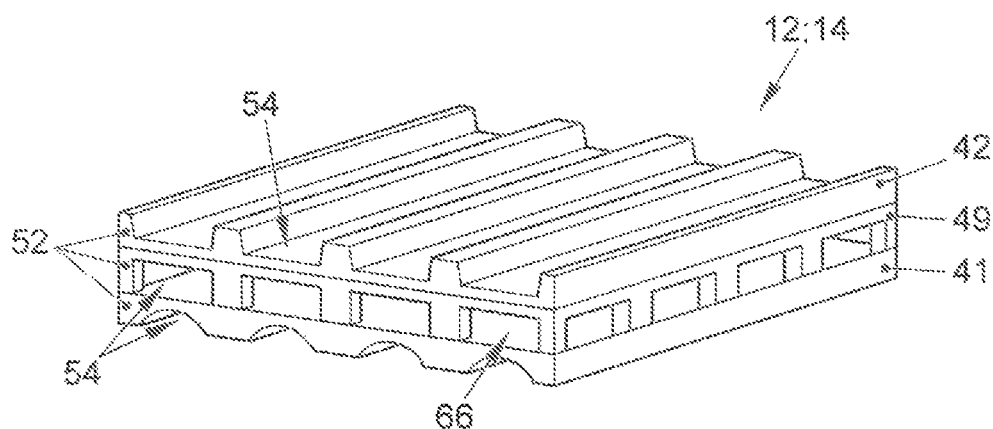
FIG. 5 shows a three-dimensional view of the portion of the polar plate.
Figure 6:
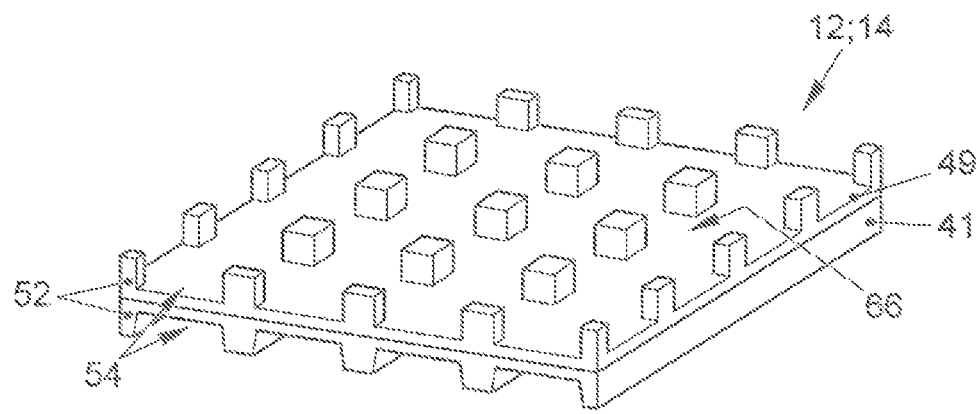
FIG. 6 shows a three-dimensional view of two single plates of the polar plate.

FIG. 4 shows a side view of a partial area 48 (which is shown by way of example in FIG. 3) of a polar plate 12. FIG. 5 furthermore shows a three-dimensional view of the partial area 48 of the polar plate 12, and FIG. 6 shows a three-dimensional view of two single plates 41, 49 of the polar plate 12. The polar plate 12 shown in FIGS. 4 to 6 is designed as a bipolar plate 14. FIGS. 5 to 14 also show by way of example a partial area 48 of the polar plate 12.

In contrast to the explanations relating to FIG. 3, the polar plate 12 of FIGS. 4 to 6 now has a third single plate 49, which forms the coolant cavity 66. It is readily apparent that the single plates 41, 42, 49 respectively form elevations 52 with free spaces 54 arranged therebetween, thereby forming flow structures (flow fields) for the operating media. In this case, the free spaces 54 of the single plates 41 and 42 are formed as channels 46.

Such polar plates 12, whose single plates 41, 42, 49 form flow structures only on one of their main sides, are typically formed of carbon.

At least one of the single plates 41, 42, 49 has spring projections 56, which are not shown in FIGS. 3 to 6. The spring projections 56 are arranged on the elevations 52 and designed to yield in case of a force effect F taking place orthogonally to the main sides 58 of the single plate 41, 42, 49. The spring projections 56 are part of the single plate 49, i.e., for example welded to it.

According to a first embodiment of the invention, the polar plate 12 comprises a third single plate 49, which is a middle single plate 49 (i.e., a coolant plate 49). The third single plate 49 has the spring projections 56. This can be seen in FIGS. 7 to 9.

Figure 7:
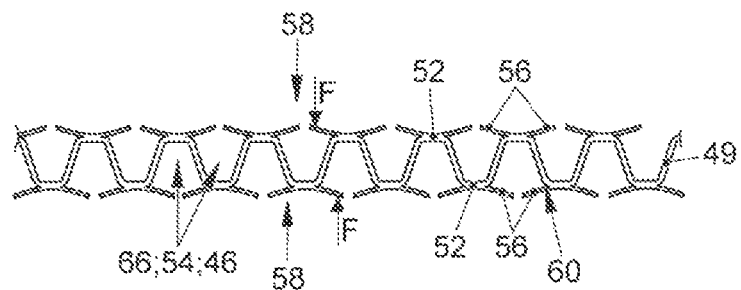
FIG. 7 shows a side view of a partial area of a single plate according to a preferred embodiment with undeformed spring projections.
Figure 8:
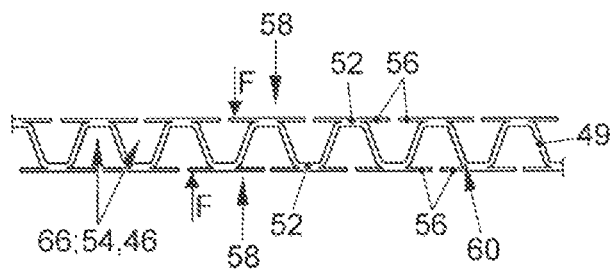
FIG. 8 shows a side view of the partial area of the single plate with deformed spring projections.
Figure 9:
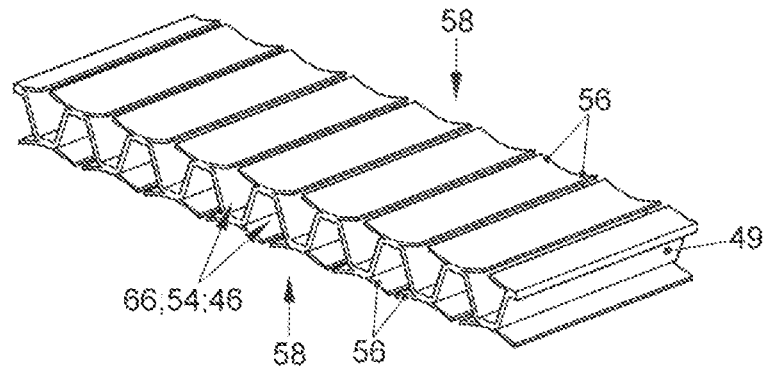
FIG. 9 shows a three-dimensional view of the partial area of the single plate with undeformed spring projections.

FIG. 7 shows a side view of a partial area 48 of the third single plate 49 according to a preferred embodiment with undeformed spring projections 56, while FIG. 8 shows the lateral view of the partial area 48 of the single plate 49 with deformed spring projections 56. FIG. 9 also shows a three-dimensional view of the partial area 48 of the single plate 49 with undeformed spring projections 56.

The spring projections 56 are now aligned such that, starting from an edge region 60 of the elevations 52, they at least partially cover the nearest free spaces 54 and protrude from the single plate 49. The single plate 49 has the spring projections 56 on its two main sides 58.

If a force effect F occurs orthogonally to the main sides 58 on the spring projections 56, they deform and pass on the resulting forces to the elevations 52. Within the fuel cell stack 100, such a force effect is brought about by the pressing of the fuel cell stack 100 by means of the tension elements 21. Due to the spring elements 56, now tolerance-related or deformation-related distances are bridged within the polar plate 12, so that an electrically conductive contact between the outer single plates 41, 42 (the reactant plates) is improved. Furthermore, the outer single plates 41, 42 are also slightly pressed apart by the spring elements 56, so that a contact pressure of the elevations 52 of the outer single plates 41, 42 to the adjacent membrane electrode assemblies 10 is optimized.

As can be seen in FIGS. 7 to 10, the free spaces 54 of the third single plate 49 are formed as channels 46. The spring projections 56 extend along the channels 46, thus have an elongated course—see FIG. 9.

The middle single plate 49 shown in FIGS. 7 to 10 forms flow structures for a coolant on its two main sides 58. For this purpose, it has a cross-section of a profiled metal sheet in the area of the flow structures.

Figure 10:
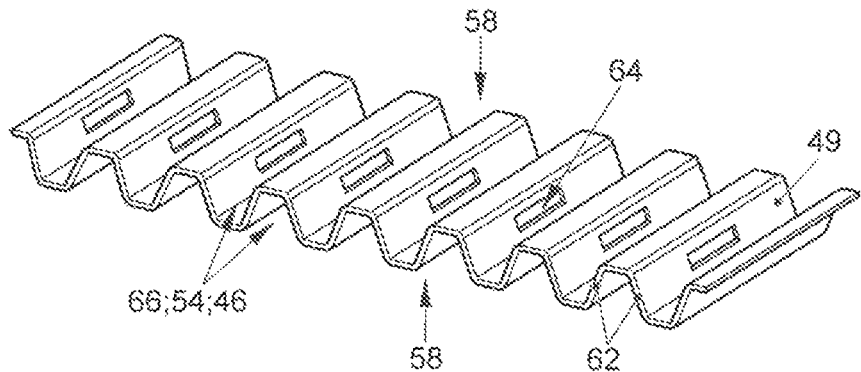
FIG. 10 shows another embodiment of the partial area of the single plate in a partial view.

FIG. 10 shows a variant of the third single plate 49 known from FIGS. 7 to 9, according to which flanks 62 of the profiled metal sheet have continuous recesses 64. This reduces a loss of flow within the coolant cavity 66. In order to be able to show the recesses 64, the spring projections 56 are not shown in FIG. 10.

Since the third single plate 49 is a coolant plate 49, the main sides 58, on which the spring projections 56 are arranged, are arranged inside the polar plate 12.

The third single plate 49 shown in FIGS. 7 to 10 may in particular be made of a metal, while the outer single plates 41, 42 illustrated in FIGS. 4 and 5 may comprise carbon as the material. As a result, resilient properties of the metal of the middle single plate 49 can be combined with the advantageous properties of carbon of the two outer single plates 41, 42.

Figure 11:
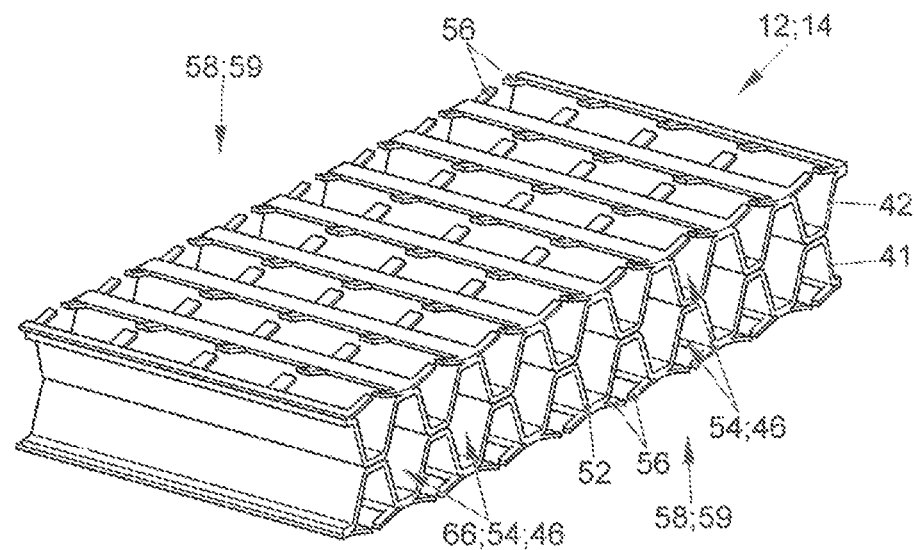
FIG. 11 shows a three-dimensional view of a partial area of a polar plate according to another preferred embodiment.
Figure 12:
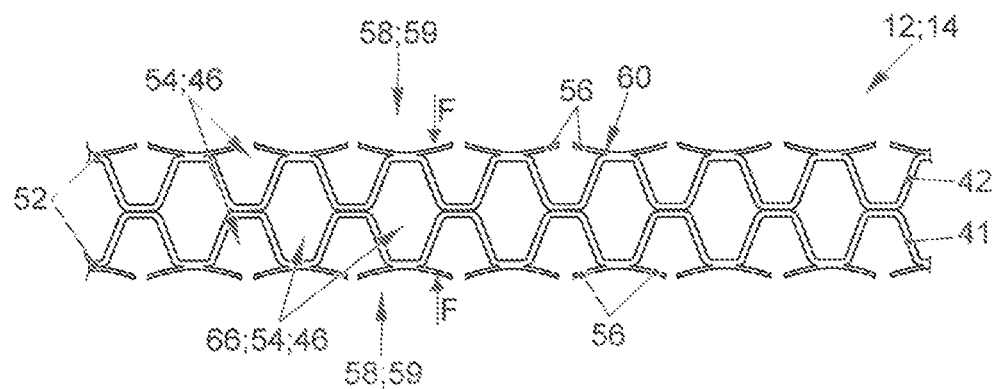
FIG. 12 shows a side view of the partial area of the polar plate with undeformed spring projections.
Figure 13:
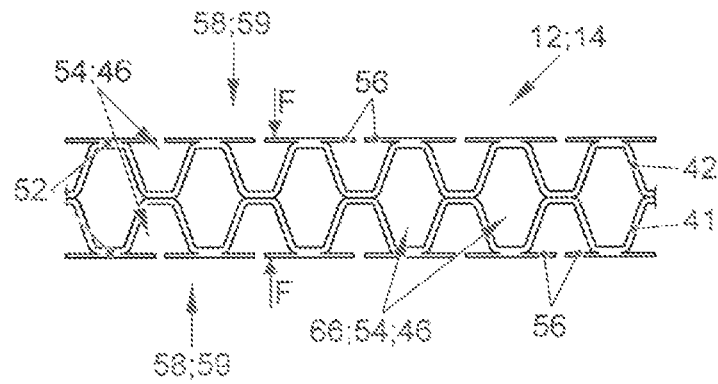
FIG. 13 shows a side view of the partial area of the polar plate with deformed spring projections.

FIGS. 11 to 14 show a second preferred embodiment of the invention. Again, only a partial area 48 of a polar plate 12 shown in FIG. 3 is depicted. FIG. 11 is a three-dimensional view of the partial area 48 of the polar plate 12. FIG. 12 furthermore shows a side view of the partial area 48 of the polar plate with undeformed spring projections 56, while in FIG. 13, the spring projections 56 are shown deformed.

The polar plate 12 according to the second embodiment differs from the first embodiment according to FIGS. 4 to 10 in that the polar plate 12 (which is also a bipolar plate 14) comprises only two single plates 41, 42 instead of three single plates 41, 42, 49. Thus, the middle, third single plate 49 is omitted. This is possible because the first and second single plates 41 and 42 are not only designed as reactant plates 41, 42. Rather, the single plates 41 and 42 have a cross-section of a profiled metal sheet. Thus, the coolant cavity 66 is formed on main sides 58 of the single plates 41, 42, which face the inside of the polar plate 12.

The spring projections 56 are now not arranged on the inward facing main sides 58 of the single plates 41, 42. Instead, the spring projections 56 are arranged on main sides 58 of the single plates 41, 42, which represent reactant sides 59 of the polar plate 12, i.e., the outer main sides 58 of the polar plate 12.

The spring projections 56 are accordingly, in deviation from the first embodiment, formed as individual spring webs, which protrude from the elevations 52. Sufficient space is left between the individual spring projections 56 so that a reactant can flow between the spring projections 56 into an adjacent gas diffusion layer 40 (see FIG. 2).

The spring projections 56 arranged on the reactant sides 59 now have several advantages. On the one hand, they serve to prevent penetration of the gas diffusion layers 40 and/or the membrane electrode assemblies 10, in particular of a film frame 38, into the free spaces 54 of the reactant-side flow structures. Furthermore, the spring forces acting on the gas diffusion layers 40 and thus the membrane electrode assemblies 10 by the spring projections 56 counteract delamination within the fuel cell stack 100.

Figure 14:
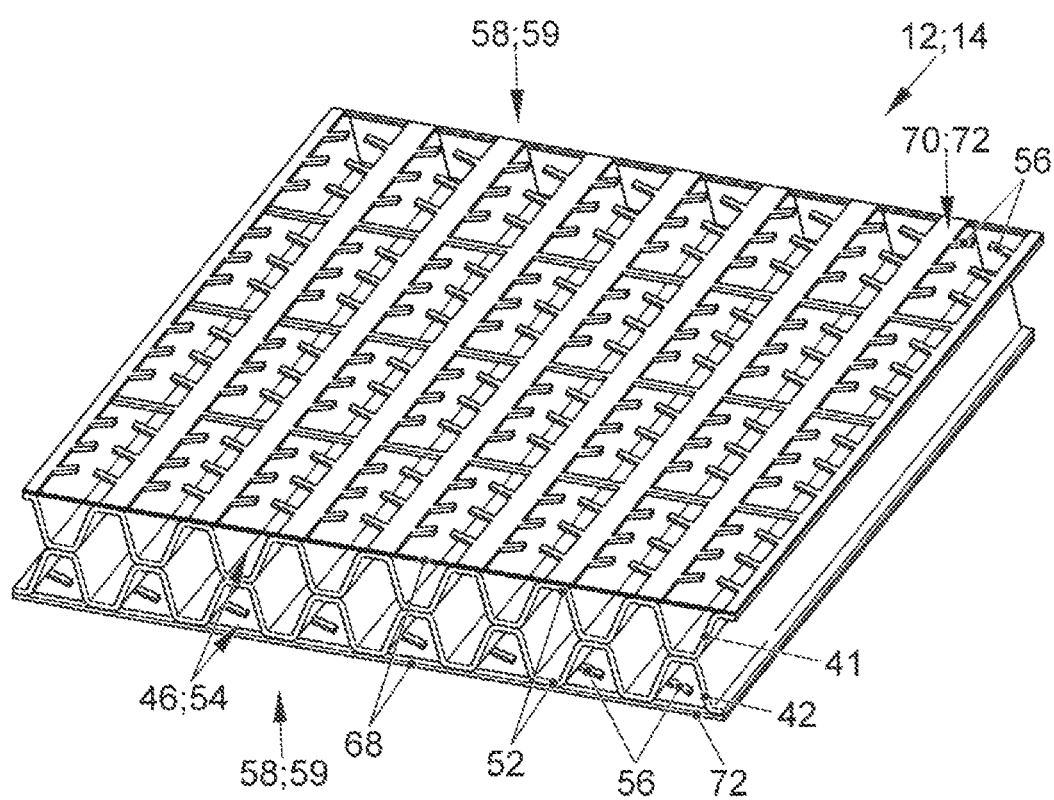
FIG. 14 shows a three-dimensional view of a partial area of a polar plate according to another preferred embodiment.

Finally, FIG. 14 shows a three-dimensional view of a partial area 48 of a polar plate 12 (likewise a bipolar plate 14) according to another preferred embodiment. This differs from the embodiment of FIGS. 11 to 13 in that the single plates 41, 42 have support means 68 which, as webs 68, connect adjacent elevations 52. This increases the stability of the polar plate 12 and, in addition, offers additional protection against the penetration of a gas diffusion layer 40 and/or a film frame 38 into the free spaces 54.

The spring projections 56 shown in FIGS. 7 to 9 and 11 to 14 can be integrally connected to spring carriers 70 of the respective single plate 41, 42 or also 49. For example, the spring projections 56 can be punched out from a metal sheet together with the spring carrier 70 and then firmly bonded, for example welded, to the respective single plates 41, 42 or 49. A plurality of spring carriers 70 with the spring projections 56 may together form a spring plate 72. Thus, during the manufacturing of the single plates 41, 42, 49, the spring projections 56, spring carriers 70 and/or the spring plate 72 can first be components separate from the single plates 41, 42, 49, which are added to the single plates 41, 42, 49 in the further manufacturing. If the spring carriers 70 are combined to form a spring plate 72, the spring carriers 70 can be positioned particularly simply in relation to the elevations 52.

The spring carriers 70 follow a course of the elevations 52, i.e., are adapted to a shape of the elevations 52. This allows the spring projections 56 to be particularly easily firmly bonded by means of the spring carriers 70 with the projections 52 of the single plates 41, 42, or 49.

The allocation of the first and second single plate 41, 42 to the anode and cathode sides 43, 44 carried out in the figures, can incidentally also be reversed so that the first single plate 41 is arranged on the anode side 43 and the second single plate 42 is arranged on the cathode side 44.

For example, the polar plates 12 can have a thickness (material thickness) of 50 μm (microns) and the spring projections of 25 μm. Furthermore, according to FIG. 13, the polar plate 12 can have a height of 0.84 mm (millimeters) when the spring projections 56 are completely deformed.

All embodiments of FIGS. 4 to 14 have in common that with appropriate dimensioning of the spring projections 56, so-called compression springs (not shown) can be dispensed with. According to the prior art, such compression springs are arranged between the monopolar plates 16 and the end plates 18 and absorb, for example, thermal expansions within the fuel cell stack 100 during operation of the fuel cell stack 100. Compression springs are relatively heavy and require a lot of space whereby a space requirement of a housing of the fuel cell stack 100 is increased. Furthermore, the compression springs within the fuel cell stack 100 cannot compensate for locally occurring tolerances.

Due to the spring projections 56 according to the invention, which are arranged in a distributed manner within the fuel cell stack 56 [sic: 100], such compression springs can now be dispensed with. For this purpose, the spring projections 56 can be arranged in the area 57—see FIG. 3. The fuel cell stack 100 is thus not only lighter and consumes less space, but the pressing of its individual components is also made more even.

LIST OF REFERENCE SYMBOLS

10 Membrane electrode assembly
11 Single cell
12 Polar plate
14 Bipolar plate
16 Monopolar plate
18 End plate
20 Seal
21 Tension element
22 Anode inlet opening
24 Anode outlet opening
26 Cathode inlet opening
28 Cathode outlet opening
30 Coolant inlet opening
32 Coolant outlet opening
34 Membrane
36 Electrodes
38 Film frame
40 Gas diffusion layer
41 First single plate/first reactant plate/cathode plate
42 Second single plate/second reactant plate/anode plate
43 Anode side
44 Cathode side
46 Channel
48 Partial area
49 Third single plate/center single plate/coolant plate
52 Elevations
54 Free spaces
56 Spring projection
57 Area with spring projections
58 Main side
59 Reactant side
60 Edge region of the elevation
62 Flank
64 Continuous recesses
66 Coolant cavity
68 Support means/web
70 Spring carrier
72 Spring plate
100 Fuel cell stack
102 Inlet-side anode main supply channel
104 Outlet-side anode main supply channel
106 Inlet-side cathode main supply channel
108 Outlet-side cathode main supply channel
110 Inlet-side coolant main supply channel
112 Outlet-side coolant main supply channel
AA Active area (reaction area)
IA Inactive area
SA Supply area
DA Distribution area
S Stack direction
F Force effect

The invention claimed is:

1. A polar plate for a fuel cell, comprising:
at least one single plate having a first main side and a second main side opposite to the first main side, wherein the single plate has, on the first main side:
a plurality of elevations and a plurality of free spaces, wherein the plurality of elevations and the plurality of free spaces form a flow structure for an operating medium of the fuel cell; and
a plurality of spring projections arranged on the plurality of elevations and formed to yield in case of a force effect taking place orthogonally to the first main side,
wherein the plurality of spring projections are part of the single plate, and
wherein the plurality of spring projections project from edge regions of the plurality of elevations and at least partially cover the plurality of free spaces.

2. The polar plate according to claim 1, wherein the plurality of free spaces are formed as channels and the plurality of spring projections extend along the channels.

3. The polar plate according to claim 1, wherein the first main side is a reactant side of the polar plate.

4. The polar plate according to claim 1, wherein the single plate has spring carriers and some of the plurality of the spring projections are integrally connected to each of the spring carriers, wherein the spring carriers have shapes corresponding to a shape of the plurality of elevations.

5. The polar plate according to claim 1, wherein the single plate forms flow structures for a coolant and has a cross-section of a profiled metal sheet in an area of the flow structures for the coolant, wherein flanks of the profiled metal sheet have continuous recesses.

6. A fuel cell stack, comprising:
at least one bipolar plate including at least one single plate having a first main side and a second main side opposite to the first main side, wherein the single plate includes a metal sheet that has, on the first main side:

a plurality of elevations and a plurality of free spaces, wherein the plurality of elevations and the plurality of free spaces form a flow structure for an operating medium of the fuel cell; and a plurality of spring projections arranged on the plurality of elevations and formed to yield in case of a force effect taking place orthogonally to the first main side, wherein the plurality of spring projections are an integral part of the metal sheet, wherein the plurality of swing projections project from edge regions of the plurality of elevations and at least partially cover the plurality of free spaces.

7. The fuel cell stack according to claim 6, wherein the plurality of free spaces are formed as channels and the plurality of spring projections extend along the channels.

8. The fuel cell stack according to claim 6, wherein the first main side is a reactant side of the bipolar plate.

9. The fuel cell stack according to claim 6, wherein the single plate has spring carriers and some of the plurality of the spring projections are integrally connected to each of the spring carriers, wherein the spring carriers have shapes corresponding to a shape of the plurality of elevations.

10. The fuel cell stack according to claim 6, wherein the single plate forms flow structures for a coolant and has a cross-section of a profiled metal sheet in an area of the flow structures for the coolant, wherein flanks of the profiled metal sheet have continuous recesses.

* * * * *